United States Patent [19]

Wilson

[11] Patent Number: 4,622,851
[45] Date of Patent: * Nov. 18, 1986

[54] DEVICE FOR MEASURING LUBRICATING OIL TEMPERATURE SUPPLIED TO AN INTERNAL COMBUSTION MOTORCYCLE ENGINE

[76] Inventor: Thomas E. Wilson, 710 E. Ten Mile Rd., Ferndale, Mich. 48220

[*] Notice: The portion of the term of this patent subsequent to Aug. 25, 1998 has been disclaimed.

[21] Appl. No.: 195,817

[22] Filed: Oct. 10, 1980

Related U.S. Application Data

[63] Continuation of Ser. No. 899,803, Apr. 25, 1978, Pat. No. 4,285,238.

[51] Int. Cl.⁴ .............................................. G01K 1/14
[52] U.S. Cl. ...................................... 73/292; 374/208; 403/27
[58] Field of Search ............... 73/292, 343 B, 346, 73/347, 348, 349; 33/126.7; 184/1 C; 340/57, 59; 403/24, 27; 374/208

[56] References Cited

U.S. PATENT DOCUMENTS

| 1,102,062 | 6/1914 | Liedtke | 73/349 |
| 1,399,534 | 12/1921 | Witham | 73/349 |
| 1,781,512 | 11/1930 | Holt | 73/346 |
| 3,274,691 | 9/1966 | Bolles | 73/292 |
| 3,625,596 | 12/1971 | Manke | 73/126.7 |
| 3,845,661 | 11/1974 | Hollweck et al. | 73/349 |
| 4,154,105 | 5/1979 | Mackley | 73/346 |

FOREIGN PATENT DOCUMENTS 352218 7/1931 United Kingdom ............ 180/33 R

OTHER PUBLICATIONS

EMPI Dealer Catalog, a publication of Engineered Motor Products, Riverside, CA 92502, p. N3.

Primary Examiner—Jerry W. Myracle
Attorney, Agent, or Firm—Cullen, Sloman, Cantor, Grauer, Scott & Rutherford

[57] ABSTRACT

A device for measuring engine lubricating oil temperature circulating through the oil lubricating system of an internal combustion engine of a motorcycle. Another advantageous embodiment consists of a stem-type thermometer attached to the wall of the oil reservoir with the temperature sensing stem projecting through an appropriate aperture in the oil reservoir wall. In situations wherein the oil reservoir is connected to the internal combustion engine of the motorcycle by an oil carrying conduit, yet another advantageous embodiment can be employed which consists of a branch conduit projecting from the oil carrying conduit with the temperature sensing stem of the thermometer extending axially into the branch conduit. A further advantageous embodiment consists of a stem-type thermometer having markings along the temperature sensing stem corresponding to various oil levels. The thermometer is mounted to the oil filler cap of the oil reservoir such that when the oil filler cap is in place closing the oil filler port of the oil reservoir, the temperature sensing stem projects into the interior of the oil reservoir.

1 Claim, 8 Drawing Figures

DEVICE FOR MEASURING LUBRICATING OIL TEMPERATURE SUPPLIED TO AN INTERNAL COMBUSTION MOTORCYCLE ENGINE

This is a continuation of application Ser. No. 899,803 filed Apr. 25, 1978, now U.S. Pat. No. 4,285,238.

BACKGROUND OF THE INVENTION

The present invention relates to thermometers, and more particularly to a thermometer for measuring the oil temperature being supplied to an internal combustion engine especially those used to power motorcycles.

The temperature of the lubricating oil supplied to an internal combustion engine is critical to the performance and life of the engine. In motorcycle applications, because they are recreational vehicles and therefore often driven fast over rough terrain and under heavy loads, the engine lubricating oil temperature can rise above 200° F. It is believed that every 20° F. increase in engine oil lubricating temperature reduces the lubricating quality of the oil by 50%. In addition, of course, the higher the temperature of the lubricating oil, the less is its ability to aid in cooling the engine because of improper lubricating temperature. Therefore, there is a special need in motorcycle applications for an oil temperature measuring device. However, in motorcycle applications, particularly for motorcycles used for off-the-road riding, this need is complicated somewhat by the fact that the oil temperature measuring device must be sturdy to withstand the rigors of vibration and impact as will occur when the motorcycle is driven over rough terrain or in a race.

Temperature sensing devices for measuring the temperature of oil being supplied to an internal combustion engine are known, for example, as disclosed in U.S. Pat. No. 1,678,389 issued on July 24, 1928 to A. Holmes.

However, none of the oil temperature measuring devices known to me satisfies the above-mentioned requirements for motorcycle applications.

SUMMARY OF THE INVENTION

It is an object of the present invention to provide a lubricating oil temperature measuring device to measure the temperature of lubricating oil being supplied to the internal combustion engine of a motorcycle.

It is another object of the present invention to provide such a temperature measuring device which is sturdy enough to withstand the rigors of vibration and impact.

It is a further object of the present invention to provide such a temperature measuring device which is straightforward and, therefore, relatively inexpensive to manufacture and maintain.

More particularly, the present invention, in one advantageous embodiment, consists of a stem-type thermometer attached to the engine with the temperature sensing stem projecting through an appropriate aperture into the oil flow passage of the lubricating system.

The present invention, in another advantageous embodiment, provides a device to accurately measure lubricating oil temperature in an oil reservoir for an internal combustion engine of a motorcycle which comprises a stem-type thermometer attached to the wall of the oil reservoir with the temperature sensing stem of the thermometer projecting through an appropriate aperture in the wall of the reservoir and the temperature indicating head of the thermometer disposed to the exterior side of the oil reservoir.

In yet another advantageous embodiment, which is particularly well suited for applications wherein the oil reservoir is connected to the internal combustion engine of a motorcycle by means of an oil carrying conduit, the present invention comprises a branch conduit projecting from and in fluid communication with the oil carrying conduit and having an open distal end, and a stem-type thermometer attached to the open distal end of the branch conduit with its temperature sensing stem extending a predetermined distance into and coaxial with the branch conduit.

Yet a further advantageous embodiment of the present invention provides a device to measure the lubricating oil temperature and the amount of lubricating oil in an oil reservoir for an internal combustion engine of a motorcycle which comprises an oil reservoir cap for removably closing the oil filler port in the wall of the oil reservoir, a stem-type thermometer attached to the oil reservoir cap is in position closing the oil filler port in the wall of the oil reservoir, the temperature indicator dial of the thermometer is located outside of the oil reservoir and the temperature sensing stem projects into the interior of the oil reservoir. A scale is associated with the temperature sensing stem of the thermometer for measuring the amount of lubricating oil in the oil reservoir.

BRIEF DESCRIPTION OF THE DRAWINGS

A better understanding of the invention will be achieved upon reference to the accompanying specification and by reference to the drawings wherein like numerals refer to like parts throughout the several views and in which.

DETAILED DESCRIPTION

Figure 1:
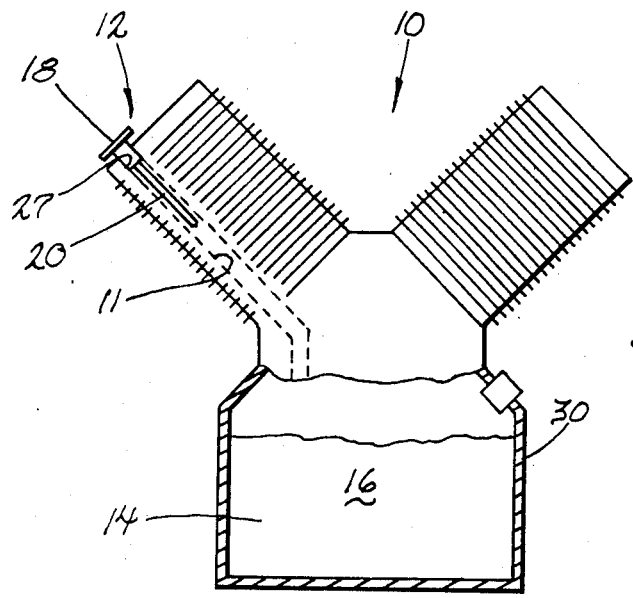
FIG. 1 is a partially sectioned schematic representation of an internal combustion engine for a motorcycle having one advantageous embodiment of the present invention.

With reference to FIG. 1, there is shown a schematic representation of an internal combustion engine 10 for a motorcycle which has an oil lubricating system represented, for simplicity's sake, by the oil flow passage 11, it being understood that the oil lubricating system may have many such passages throughout the engine to carry oil to the various engine parts requiring lubrication.

Figure 8:
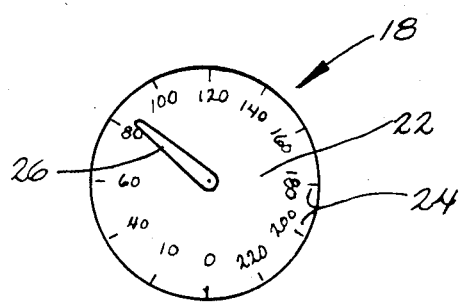
FIG. 8 is a view of a component of the present invention taken in the direction of arrows 8—8 in FIGS. 3, 5 and 7.

The stem-type thermometer 12 comprises temperature indicating means 18 and a temperature sensing stem 20 extending from the temperature indicating means 18. The temperature indicating means 18 is illustrated in FIG. 8 as a dial 22 having a plurality of numerals 24 in spaced circular array and a pointer 26 pivotally mounted thereto for indicating the numeral 24 corresponding to the temperature of the oil sensed by the temperature sensing stem 20. The internal structure of the thermometer 12 can be of any conventional internal structural design and does not constitute a part of the present invention. Therefore, the internal structure of the thermometer 12 will not be discussed here.

An appropriate aperture 27 is made in the engine 10 at any convenient location to communicate with the oil flow passage 11 of the lubricating system. The thermometer 12 is attached to the engine with the temperature sensing stem 20 projecting through the aperture 27 into the oil flow passage 11 of the lubricating system so that it is in at least partially submerged relationship with the oil flowing through the oil flow passage 11 of the lubricating system, and with the temperature indicator means disposed to the exterior of the engine 10.

Figure 2:
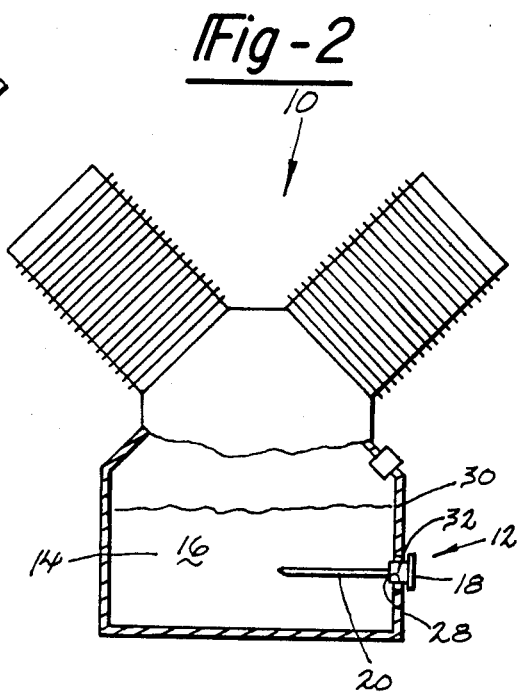
FIG. 2 is a partially sectioned schematic representation of an internal combustion engine for a motorcycle having another advantageous embodiment of the present invention.

With reference to FIG. 2, there is shown a schematic representation of an internal combustion engine for a motorcycle having a stem-type thermometer 12 of conventional construction mounted in the oil reservoir or engine crankcase 14 of the engine 10 for measuring the temperature of the lubricating oil 16 in the oil reservoir 14.

Figure 3:
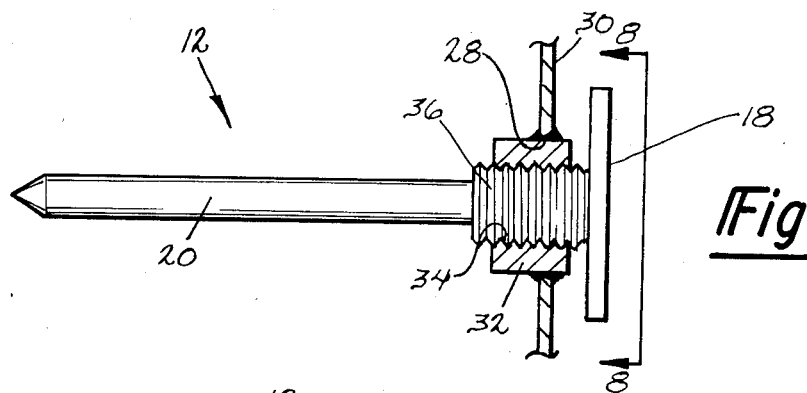
FIG. 3 is an enlarged cross-sectional view of a portion of FIG. 1.

With reference to FIGS. 2 and 3, an aperture 28 is made in the wall 30 of the oil reservoir 14. The thermometer 12 is attached to the wall 30 with the temperature sensing stem 20 projecting through the aperture 28 into the interior of the oil reservoir 14 so that it is in at least partially submerged relationship with the oil 16 in the reservoir 14 and the temperature indicator means 18 is disposed to the exterior of the reservoir 14. The thermometer 12 may be attached to the reservoir wall 30 by virtually any conventional or otherwise convenient means. For example, a coupling or fitting 32 having an internally threaded bore 34 can be affixed to the reservoir wall 30 at the aperture 28 as by for example, welding or brazing, and the thermometer 12 can be fabricated with an externally threaded boss 36 which threadably mates with the threaded bore 34 of the coupling 32.

Figure 4:
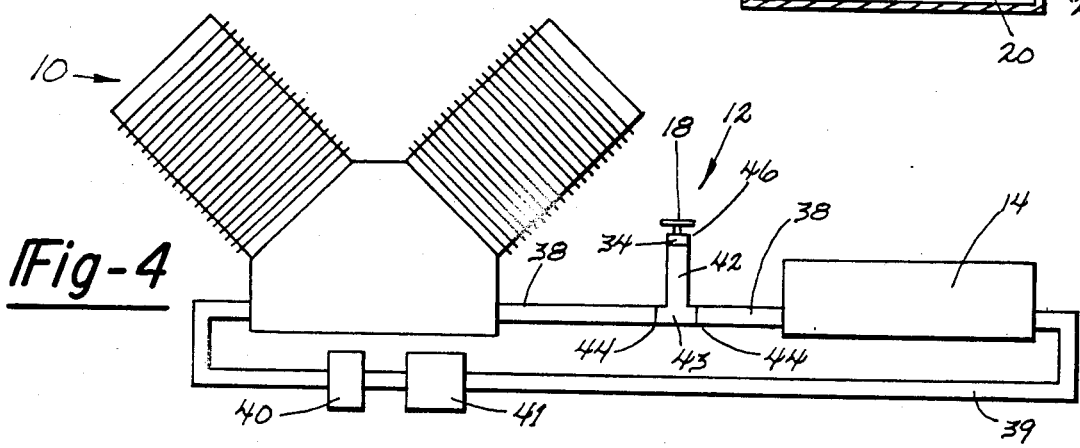
FIG. 4 is a partially sectioned schematic representation of an internal combustion engine for a motorcycle having yet another advantageous embodiment of the present invention.
Figure 5:
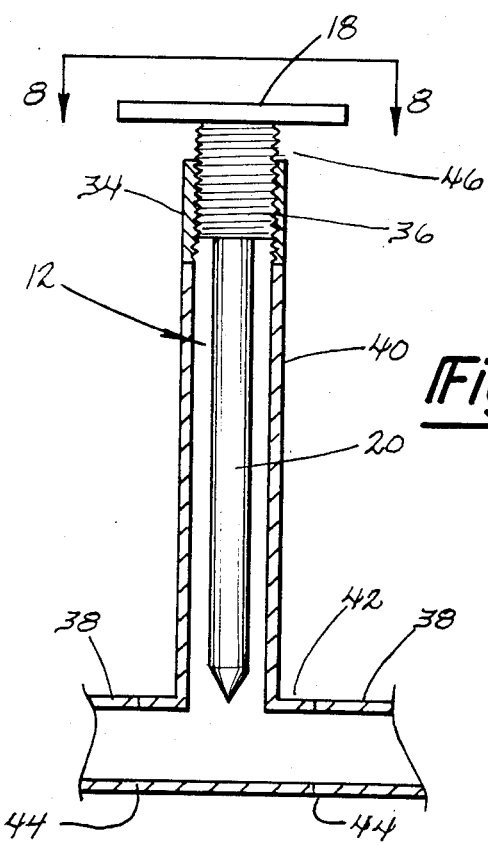
FIG. 5 is an enlarged cross-sectional view of a portion of FIG. 4.

Now, with reference to FIGS. 4 and 5, there is shown another advantageous embodiment of the present invention which is particularly useful in applications wherein the oil reservoir 14 supplies lubricating oil to the internal combustion engine 10 of the motorcycle through an oil carrying conduit 38. After the oil circulates through the engine 10, it is returned to the reservoir 14 through an oil return conduit 39. An oil filter 40 and an oil cooler 41 may be disposed in the oil return conduit to filter particulate matter from the return oil and to cool it, respectively. A branch conduit 42 is illustrated as being, for example, in fluid oil communication with and projecting from the oil carrying conduit 38 between the oil reservoir 14 and engine 10. This branch conduit 42 is connected at one of its ends 43 to the oil carrying conduit 38 by virtually any conventional or otherwise convenient means such as, for example, brazing as shown at the numeral 44. The other or distal end 46 of branch conduit 42 is open. The thermometer 12 is attached to the branch conduit 42 at the open distal end 46 with its temperature sensing stem 20 projecting a predetermined axial distance into the branch conduit 42 and with the temperature indicating means 18 disposed outside the branch conduit 42 at the distal end 46. Preferably, the temperature sensing stem 20 should not interfere with the flow of oil in the oil carrying conduit 38 and should, therefore, not project into the oil carrying conduit 38, but should terminate proximate the intersection of the branch conduit 40 and oil carrying conduit 38. It should be clearly understood that the branch conduit 42 could be as well disposed anywhere in the return oil conduit 39, such as, between the engine 10 and oil filter 40, or between the oil filter 40 and oil cooler 41, or between the oil cooler 41 and oil reservoir 14. In addition, in those motorcycles incorporating a separate oil vent conduit between the engine and oil reservoir, the branch conduit 42 could be just as readily attached to this oil vent conduit.

The connection of the thermometer 12 to the distal end 46 of the branch conduit 42 can be made by any conventional or otherwise convenient means. For example, the thermometer 12 can be fabricated with a threaded boss 36 which mates with a threaded coupling or compression fitting 34 connected at the distal end 46 of the branch conduit 42.

Figure 6:
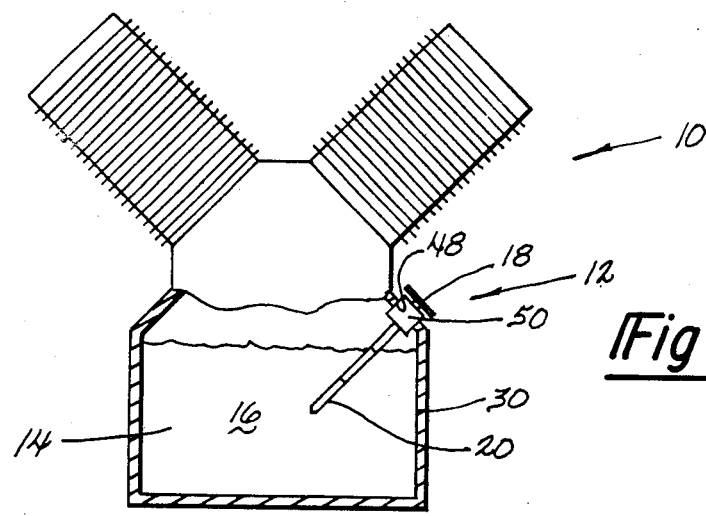
FIG. 6 is a partially sectioned schematic representation of an internal combustion engine for a motorcycle having a further advantageous embodiment of the present invention.
Figure 7:
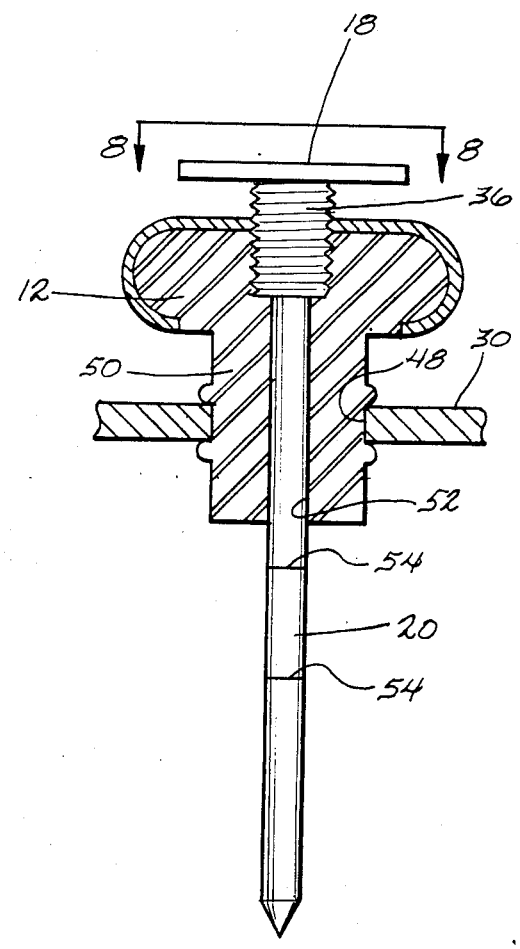
FIG. 7 is an enlarged cross-sectional view of a portion of FIG. 6.

With reference to FIGS. 6 and 7, there is shown a further advantageous embodiment of the present invention which utilizes the oil filler port 48 of the oil reservoir 14 of the internal combustion motorcycle engine 10. The thermometer 12 is attached to the oil filler port cap 50 which is used to removably close the oil filler port 48. The oil filler port cap 50 is formed with an axis of symmetry one aperture 52 therethrough. The thermometer 12 is attached to the oil filler port cap 50 by inserting the temperature sensing stem 20 through the aperture 52 such that the temperature indicating means 18 is disposed to one side of the cap 50 and the temperature sensing stem 20 projects from the opposite side of the cap 50. Thus, when the cap 50 is in position closing the oil filler port 48, the temperature sensing stem 20 projects into the interior of the oil reservoir 14 in at least partially submerged relationship with the oil 16 in the reservoir 14 and with the temperature indicator means 18 located outside of the oil reservoir 14. Furthermore, the temperature sensing stem 20 has indicia associated with it such as, for example, graduated marks 54 for indicating various predetermined amounts of oil in the reservoir 14. Thus, when it is desired to determine the amount of lubricating oil in the reservoir 14, the cap 50 is removed and that portion of the temperature sensing stem 20 wetted by the oil is compared to the graduated marks 54.

The means by which the thermometer 12 will be attached to the oil filler port cap 50 will vary depending upon the structure of the cap itself and may be any conventional or convenient means. For example, if the cap 50 is fabricated of rubber, the aperture 52 through the cap 50 may be slightly smaller in transverse cross section than the cross-sectional size of the temperature sensing stem 20 in which case the rubber material of the cap 50 surrounding the aperture 52 will tightly grip the temperature sensing stem 20. In other cases wherein the oil filler port cap 50 is fabricated of a rigid material such as metal, or partially of metal, the thermometer 12 may be fabricated with the externally threaded boss 36 into a counterbore which threadably engages an appropriately threaded aperture in the cap 50.

The present invention thus provides a device for measuring oil temperature, and for both measuring oil temperature and the amount of oil in the oil reservoir of an internal combustion motorcycle engine which is straightforward, sturdy, not within the head impact zone of the driver or in a position which may otherwise interfere with his vision or operation of the motorcycle but which is still conveniently located for determining the oil temperature and amount of oil in the reservoir and which is relatively inexpensive.

The foregoing detailed description is given primarily for clarity of understanding and no unnecessary limitations should be understood therefrom, for modifications will be apparent to one skilled in the art without departing from the scope or spirit of the invention as defined in the appended claims.

What is claimed is:

1. A device for measuring the temperature of engine lubricating oil in an oil reservoir for an internal combustion engine, said oil reservoir having a portion defining an aperture through its wall, said device comprising:

a thermometer having a closure body, said closure body mounted to said aperture, said thermometer further having temperature indicator means and a temperature sensing stem extending from said temperature indicator means with said closure body interposed said temperature indicator means and said temperature sensing stem, said temperature indicator means having one end, a dial with indicia corresponding to various temperatures at said one end and an opposite end mounted contiguous to said closure body and perpendicular to said temperature sensing stem, said opposite end including an adjustment member for adjusting said indicator with respect to said closure body, said closure body having a sealing surface configured to cooperate with said aperture for isolating the engine lubricating oil from particulate contaminants originating from sources external to the oil in said oil reservoir, and thermometer further being positioned in said aperture with said temperature indicator means disposed to the exterior of said oil reservoir such that irrespective of the angular position of said closure body in said aperture, said dial being readable by a viewer positioned above said engine, said thermometer further being attached to said oil reservoir with said temperature sensing stem projecting through said aperture in said oil reservoir and into the interior of said oil reservoir in at least partially submerged relationship with the oil in said oil reservoir;

said closure body further having an axially aligned bore for axial receipt of said temperature sensing stem, said bore having an inner diameter slightly smaller than the outer diameter of said temperature sensing stem and an axially aligned counterbore for receipt of said adjustment member, said counterbore and adjustment member having complementary interfitting threads such that said adjustment member is threadably received within said counterbore and said temperature sensing stem is tightly received within said bore ensuring a tight impermeable seal between said indicator and said closure body; and means for indicating the indicia corresponding to the temperature of the oil in said oil reservoir at any given time as sensed by said temperature sensing stem.

* * * * *